Sept. 5, 1933.    E. A. NELSON    1,925,598
BRAKE MECHANISM
Filed April 24, 1930    3 Sheets-Sheet 1

INVENTOR
Emil A. Nelson.
BY
Harness Dickey, Pierce + Hamm
ATTORNEYS.

Sept. 5, 1933.  E. A. NELSON  1,925,598
BRAKE MECHANISM
Filed April 24, 1930   3 Sheets-Sheet 2

INVENTOR
Emil A. Nelson.
BY
ATTORNEY

Sept. 5, 1933.  E. A. NELSON  1,925,598
BRAKE MECHANISM
Filed April 24, 1930   3 Sheets-Sheet 3

INVENTOR
Emil A. Nelson.
BY
Harness, Dickey, Pierce + Ham
ATTORNEYS.

Patented Sept. 5, 1933

1,925,598

UNITED STATES PATENT OFFICE 1,925,598

BRAKE MECHANISM

Emil A. Nelson, Detroit, Mich.

Application April 24, 1930. Serial No. 447,034

20 Claims. (Cl. 188—218)

This invention relates to brakes and particularly to brakes of the drum type, the principal object being the provision of a brake mechanism in which there will be a maximum amount of radiation of the heat generated by the braking action thereof.

Another object is to provide a brake drum made up of a plurality of separated braking surfaces.

Another object is to provide a brake drum made up of a plurality of braking surfaces, each of which is separated from its neighbor whereby to eliminate direct heat transfer between them.

Another object is to provide a construction whereby air may flow through the brake drum between the side edges thereof, whereby to carry off the heat generated during a braking action.

Another object is to provide a brake drum made up of a plurality of independent circular sections of relatively narrow width which co-operate with each other to form the drum, each section being separated from the adjacent section and being so supported as to permit the flow of air between each pair of sections.

Another object is to provide a brake drum comprising a perforate supporting member and a plurality of drum sections carried thereby, each of the sections being secured to the supporting member at points between their edges.

Another object is to provide a brake drum comprising a plurality of co-operating circular sections and a separate friction element for each of said sections.

Another object is to provide a brake mechanism as above described provided with a common means for simultaneously expanding the friction elements into contact with the corresponding brake sections.

Another object is to provide a brake mechanism, including a brake drum unit and a plurality of axially spaced friction elements therein adapted for engagement with the drum unit.

Other objects will be specifically pointed out or will be apparent from the following specification, reference being had to the accompanying drawings, in which.

Figure 1:
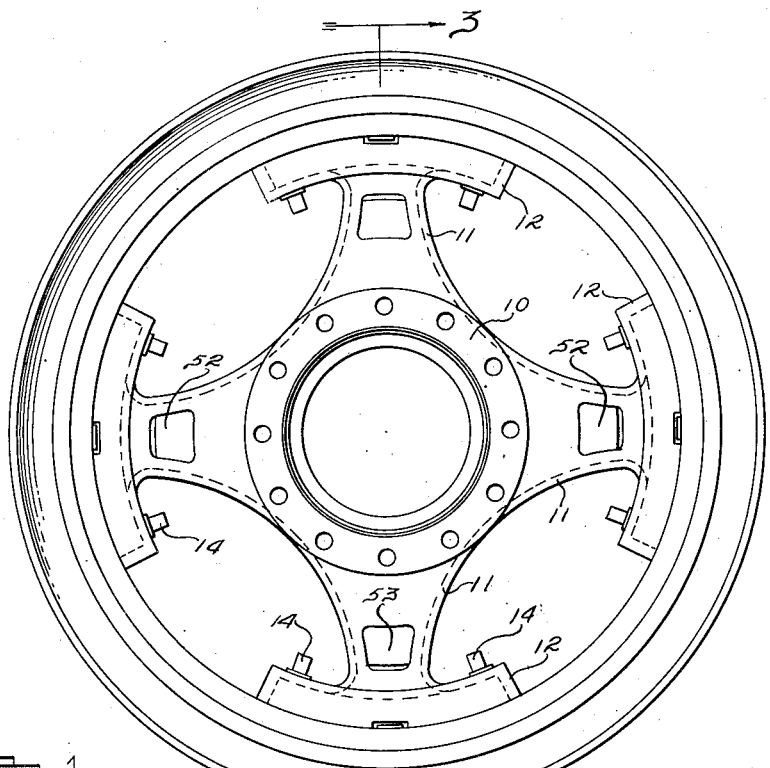
Fig. 1 is a side elevation showing the outer face of a heavy duty type of wheel for a motor vehicle incorporating the present invention.

The present invention being particularly adapted to relatively heavily constructed wheels such as, for instance, those employed on motor vehicles of the bus or truck type, I have illustrated the same in the drawings in connection with such a wheel. The particular wheel shown, apart from the specific features later noted in connection with the ventilation of the brake mechanism, forms no part of the present invention but is illustrated only for the purpose of explaining the present invention, and it is to be understood that the particular type of wheel shown may be replaced with any desired type of wheel without affecting the present invention.

Figure 2:
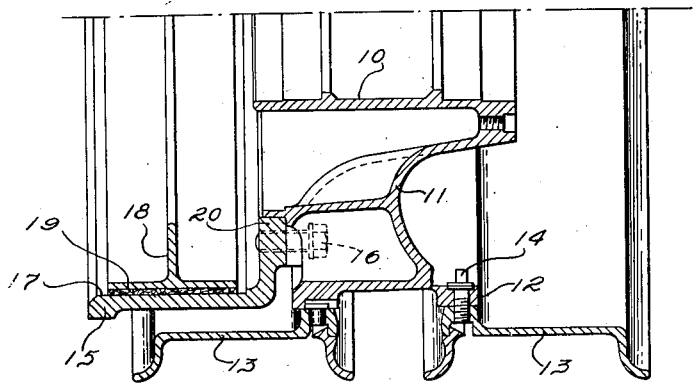
Fig. 2 is a fragmentary sectional view taken thru the axis of a wheel, showing the same equipped with a brake mechanism of conventional construction.

The particular wheel shown comprises a hub portion 10 provided with four integral hollow spokes 11, each of which terminates at its outer end in circumferentially extending pads 12, upon which are directly seated the tire rims 13 which are shown as being secured thereto by screw means 14. The particular wheel illustrated has no felloe. In providing such a wheel with brake mechanism in accordance with conventional practice a drum such as 15 may be secured to the wheel by bolts such as 16, as illustrated in Fig. 2. Such drums 15 are provided with a smooth and unbroken cylindrical inner surface 17 against which a single brake element such as 18, provided with a friction facing 19, is adapted to bear to effect a braking action on the vehicle of which the wheel forms a part. The brake element 18 may be either of the shoe type or of the wrapping band type, but is usually the former in brake mechanisms for heavy vehicles. In either case, whether the brake element is of the shoe or the band type, its width axially of the drum is substantially the same as the axial width of the brake drum and its friction facing 19 like the surface 17 is unbroken axially of the wheel.

In this type of brake mechanism, which is conventional, when the brakes are applied so as to force the shoes 19 out into contact with the portion 11 of the drum, there is a tendency for the portion 11 to distort. This is due to the fact that the edge of the drum which is secured to the wheel is held against radial expansion due to its being reinforced by the wheel as well as the usual inturned flange or head 20, and the outer edge of the drum, not being materially reinforced, is relatively weaker and consequently more readily affected by the expanding pressure of the brake element thereagainst during application of the brakes. This expansion of the drum at the outer edge, while relatively small, is often sufficient to concentrate the pressure between the brake element and the drum at the inner edge of the drum. This undue pressure causes an undue wear of both the drum and the friction element at the inner edge of the drum and this concentration of pressure over a relatively limited area is conducive to squealing brakes and scored drums. Furthermore, with these conventional constructions where there is a dragging of the brakes or a continued application of the brakes over a relatively long period of time, such as is likely to occur in descending a mountain, the friction set up between the friction element and the drum causes the drum to become heated and, in being heated, to expand. Due to the fact that the inner edge of the drum is reinforced against expansion, the greater amount of expansion will occur at the outer edge of the drum and thus distort its surface out of true cylindrical condition, tending to make it assume the shape of a frustrum on a cone, and this deformation is in addition to the usual deformation caused by the application of the brakes as above described. This deformation caused by heating of the drum aggravates the deformation due solely to the pressure of the brake elements against it and thus aggravates the condition of localized pressure and excessive wear as above described.

The deformation of the brake drum due to the heating of the same is particularly obnoxious in the case of brakes for heavy motor vehicles such as buses and trucks, due to the increased energy which must be extended in bringing the vehicle to a stop and further, because of the fact that in order to obtain the proper amount of braking surface on the brake drum, the brake drum must be made relatively wide. The relatively great width of such brake drums prevents the ready dissipation of the heat generated in them and consequently they are liable to become much hotter than the corresponding brakes on a motor vehicle of lighter construction employing narrower drums.

By the use of the present invention, I provide a construction which, because of its ability to readily dissipate any heat generated thereby, and because it eliminates the distortion due to the pressure of the brake element against the drum so prevalent in conventional constructions, is particularly adaptable for use on vehicles of the heavy type, although it will be readily recognized that its use is not at all limited to such types of vehicles.

Figure 3:
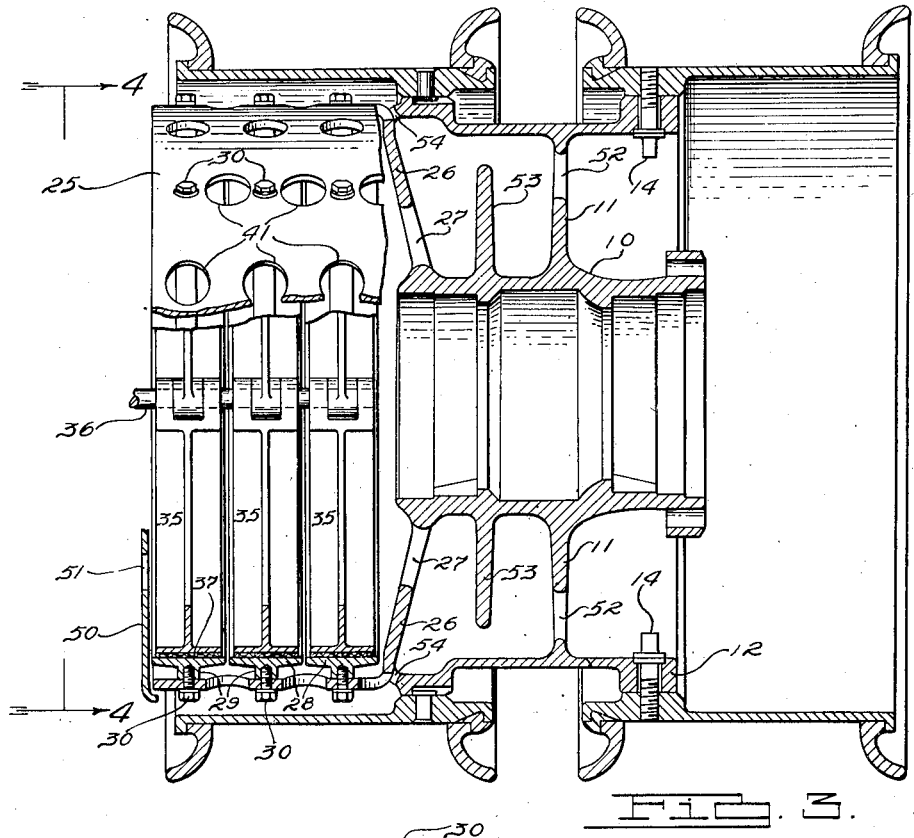
Fig. 3 is a vertical sectional view taken thru the axis of the wheel shown in Fig. 1, as on the line 3—3 of Fig. 1, showing the application of the present invention thereto.
Figure 4:
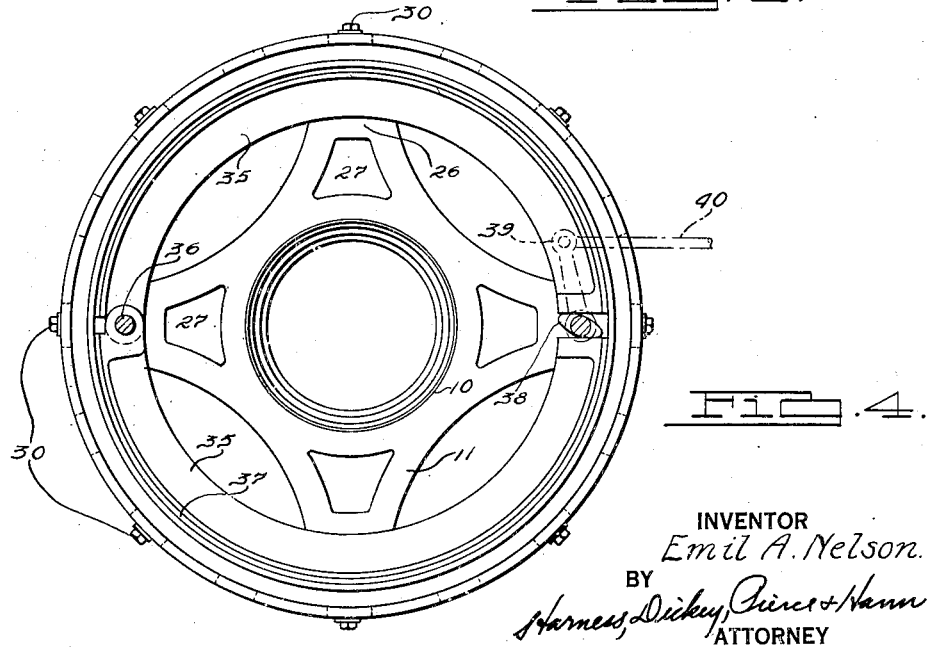
Fig. 4 is a side elevational view taken from the inside of the wheel as on the line 4—4 of Fig. 3.

Referring to Figs. 3 and 4, I show my improved brake mechanism applied to substantially the same wheel previously described. As indicated best in Fig. 3, I provide a drum-like supporting element 25 concentrically disposed with respect to the axis of the wheel. This drum 25 may be formed separately from the wheel and thereafter secured thereto as for instance in the manner in which the brake drum 15 is secured to the wheel in Fig. 2, or it may be formed integrally therewith, this latter method being the preferred method. When the drum 25 is formed integrally with the wheel, I prefer that it be formed as an extension of the inner wall 26 of the spokes 11, as indicated in Fig. 3. Within the drum 25 is arranged a plurality of brake drum elements or rings 28, these elements 28 being preferably of the type disclosed in my Letters Patent of the United States, No. 1,750,682, issued March 18th, 1930; that is, each is provided with a central radially outwardly projecting portion 29, which may be continuous or interrupted circumferentially of the element as desired, which portions fit within the drum 25 and are secured thereto by suitable means such as screws 30, thus securing the corresponding elements 28 to the drum 25. This type of drum element 29 is preferred for the reason that it is not subject to undesirable deformation under braking pressure and tends to maintain its true cylindrical form when expanded due to heat. In accordance with the present invention, each of the elements 28 are preferably slightly spaced from each other axially of the wheel.

Suitably supported against rotation within each of the elements 28 is a pair of brake shoes 35 pivotally connected together and supported as at 36, provided with a friction facing 37, and provided with a cam 38 between their adjacent free ends. The shoes 35, for each of the drum elements 28, are spaced axially of the wheel from the shoes 35 for the adjacent drum element 28 so as not to interrupt or close the space between the adjacent edges of adjacent drum elements 28 and thereby shut off the free circulation of air radially between the elements 28. All of the cams 38 for all of the elements 35 are preferably locked together for equal rotation and may be operated by means of a lever such as 39 and brake rods 40, or other suitable means.

The drum member 25 is preferably provided with a relatively great number of openings 41 therein and these openings 41 may or may not be aligned with a space between the adjacent brake elements 28 and brake elements 35 as indicated in Fig. 3.

With this construction it will be apparent that each of the brake drum elements 28, being relatively narrow in width and being supported centrally thereof, will have no tendency to depart from their true cylindrical form under the pressure of the corresponding brake elements 35 during a braking operation, and likewise will have substantially no tendency to distort out of their true cylindrical form due to becoming heated during application of the brakes or dragging of the same. This feature alone is of very great importance, and even without the ventilating feature hereinafter discussed serves to increase the effectiveness and life of conventional constructions many fold. However, due to the fact that each of the brake drum elements 28 and their corresponding shoes 35 are spaced from each other and generally spaced from the interior surface of the drum element 25, it will be apparent that during rotation of the wheel the air within the wheel will be thrown outwardly by the centrifugal action acting upon it, through the space between the various pairs of shoes 35 and between the various drum elements 28 and out through the openings 41 in the drum element 25, thus setting up a continual and relatively great flow of air from the interior to the exterior of the brake mechanism. This flow of air passing over the brake surfaces readily absorbs the heat from such surfaces and carries it out into the external air where it is rapidly dissipated. This insures an efficient and rapid cooling of all the elements of the mechanism and not only does it act to prevent any distortion that might occur due to excessive heating of the brake mechanism but it further tends to lengthen the life of the friction facing for the brake shoes and the braking surfaces of the drum elements 28.

The heat generated in the rings 28 by a braking action is further carried away therefrom by conduction through the central ribs 29 and into the drum-like supporting element 25. The flow of heat from the rings 28 in this manner is relatively rapid as the member 25 is in direct metallic contact with the rings and forms, in effect, a unitary part thereof as far as heat flow is concerned. The result is that the effective free area of radiation of the rings 28 is increased approximately three-fold, and is correspondingly greater than the effect free area of radiation of the drums of conventional constructions.

Where a conventional type of backing plate 50 is employed to close the inner end of the drum structure, it may be provided with openings 51 therein to permit the flow of air into the drum structure for cooling purposes as previously described.

However, I prefer to make the plate 50 imperforate and so form the spokes 11 of the wheel as to permit the entrance of air into the drum structure. This may be accomplished as indicated in Fig. 3 in which the outer walls of the spokes 11 are shown as being provided with openings 52 therein and the inner walls 26 with openings 27 therein. The air may thus flow into the spokes 11 through the openings 52 and out of the spokes 11 through the openings 27 into the interior of the drum structure.

In order to prevent mud or water from being splashed directly through the openings 52 and 27 into the interior of the drum structure, I prefer to provide a radial flange or baffle 53 in each spoke 11 centrally disposed between the outer and inner walls of the spoke, the baffle extending outwardly a sufficient distance to cut off direct passage of foreign matter from the opening 52 to the opening 27.

Any foreign material that might find its way into the interior of the spokes will thus be intercepted by the baffles 53 and will be thrown to the outer ends of the spokes where it may escape through the openings 54 provided for that purpose. The spokes thus serve as a means for admitting air to the brake structure, as well as a means for removing foreign material from such air.

While the preferred embodiment of my invention is illustrated in the construction shown in Fig. 3, still it will be apparent that certain disclosures therein may be employed without making such marked changes over the conventional construction as the disclosure in Fig. 3, and yet provide a construction incorporating many advantages over the conventional construction such as illustrated in Fig. 2.

Figure 5:
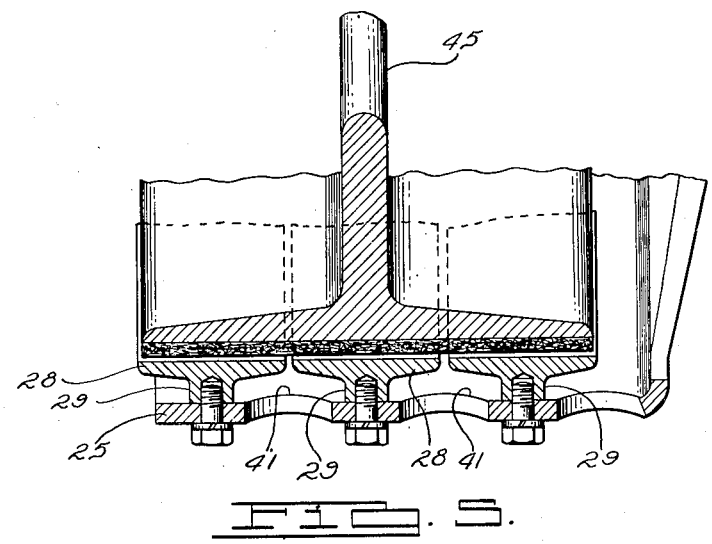
Figs. 5 and 6 are fragmentary sectional views of modified forms of the present invention.

For instance, in Fig. 5 is shown a construction involving changes over conventional constructions not so marked as the construction illustrated in Fig. 3. In Fig. 5, instead of employing a separate set of brake shoes for each separate drum element 28, only one set of shoes is employed, one of which is illustrated at 45, this shoe being broad enough on its face to simultaneously engage all three of the drum elements 28 shown. In such a case the non-distorting features of the construction previously described may, to a large extent, be realized, but the same degree of ventilation will not be realized with this construction and, therefore, it may be subjected to higher operating temperatures than the previously described construction.

Figure 6:
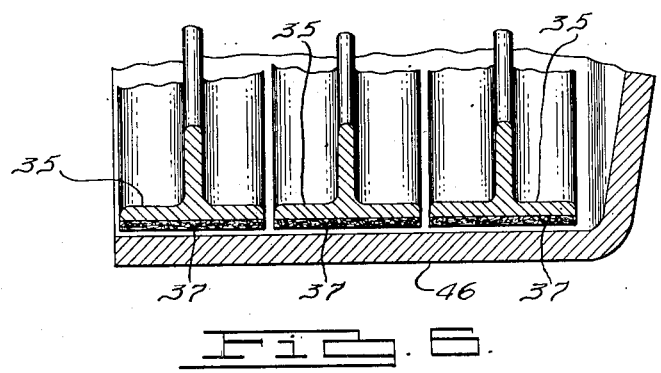

In Fig. 6 another modification is shown. In this case the drum 46 is formed as in conventional constructions but the same arrangement of brake shoes is employed as disclosed in Fig. 3. With this arrangement of brake shoes, due to the smaller width of each as compared to the conventional constructions, the heat of operation is more readily dissipated and consequently the brake element will not be subjected to the same maximum temperatures as in conventional constructions.

It will be apparent from the above description that in view of the non-distorting characteristics and heat dissipating characteristics of the present invention, the same permits a brake mechanism of materially smaller size and lighter weight to be employed on a vehicle than do conventional constructions. This feature is of particular importance in connection with motor vehicles in view of the fact that it permits the use of smaller diametered wheels and correspondingly smaller diametered tires, thus reducing the cost of the wheels and the tires to the manufacturer and to the consumer, and at the same time permits the chassis to be lowered with respect to the ground.

It is of course evident that the particular type of brake element, or elements, employed in connection with the present invention may be either of the shoe type or the expanding type without materially affecting the invention involved, and that where a plurality of brake drum elements are employed the particular configuration and construction of these elements is relatively immaterial as far as the broader aspects of the present invention are concerned. It will also be apparent that although I have shown in the accompanying drawings embodiments of my invention employing three sets of brake shoes and/or three sets of brake drum elements, the particular number employed is not important in the broader aspects of the present invention, as long as a plurality of sets of brake elements or drum elements are employed in accordance with the disclosure herein.

Formal changes may be made in the specific embodiments of the invention described without departing from the spirit or substance of the broad invention, the scope of which is commensurate with the appended claims.

I claim:—

1. A brake drum structure comprising a plurality of cylindrical drum elements axially spaced from each other, and means overlying said elements for supporting them in concentric relation.

2. A brake drum structure comprising a plurality of rings axially spaced from each other and affording an air gap between their contiguous axial extremities, and a common support for said rings.

3. A brake drum structure comprising a plurality of concentric rings, and means for supporting said rings in axially spaced relation at points between their respective side edges.

4. A brake drum structure comprising a plurality of concentric rings, and means for supporting said rings in axially spaced relation, said means being generally spaced from said rings radially outwardly thereof.

5. A brake drum structure comprising a plurality of separate concentric rings, a support for said rings located radially outwardly thereof, and means connecting said rings to said support.

6. A brake drum structure comprising a plurality of concentric rings, a support for said rings located radially outwardly thereof, and means connecting said rings in axially spaced relation to said support.

7. A brake drum structure comprising a plurality of concentric rings, a support for said rings located radially outwardly thereof and in generally spaced relation to the main body portions thereof, and means connecting said rings to said support.

8. A brake drum structure comprising a plurality of concentric axially spaced rings, and a perforate support extending over and secured to said rings.

9. A brake drum structure comprising a plurality of rings, and means for supporting said rings in concentric and axially spaced relation without materially restricting the free passage of air radially between said rings comprising a structure extending over and secured to said rings.

10. A brake drum structure comprising a plurality of concentric and axially spaced rings, and means common to all of said rings for externally supporting them in fixed relation with respect to each other, said means being formed to permit a substantial flow of air radially between said rings.

11. A brake drum structure comprising a plurality of concentric and axially spaced rings, and a drum element enclosing said rings and secured thereto, said drum element being provided with openings therethrough for the escape of air passing between said rings.

12. A brake mechanism comprising a drum structure and a friction element structure, said drum structure comprising a plurality of concentric axially spaced rings affording an air space between them for the circulation of air about the inner and outer faces of said rings and through said space and means for supporting them, and said friction element structure comprising a like number of friction units supported for engagement with said rings, and means for moving said friction units into engagement with said rings.

13. A brake structure comprising a drum structure and a friction element structure, said drum structure comprising a plurality of concentric axially spaced rings supported for substantially free passage of air between them, said friction element structure comprising a plurality of friction element units of a number corresponding to the number of said rings, said friction element units being supported in axially spaced relation and in radial alignment with their corresponding rings, and means for engaging said units with said rings.

14. A brake structure comprising a drum structure and a friction element structure, said drum structure comprising a plurality of concentric axially spaced rings each supported between its side edges for substantially free passage of air between them, said friction element structure comprising a plurality of friction element units of a number corresponding to the number of said rings, said friction element units being supported in axially spaced relation and in radial alignment with their corresponding rings, and means for engaging said units with said rings.

15. A brake drum structure comprising a plurality of concentric rings, and a support for said rings comprising a member extending over said rings and secured in direct metallic contact thereto, said member being generally spaced from the main body portions of said rings whereby to increase the effective free area of radiation thereof.

16. In combination, a wheel having hollow spokes, and a brake drum structure secured to said wheel on one side of said spokes, said spokes being provided with openings therein whereby air may flow through said spokes into said drum structure.

17. In combination a wheel having hollow spokes, a brake drum structure secured to said wheel on one side of said spokes and being closed at one end in part by said spokes each of said spokes having an opening in the outer wall thereof and an opening in the inner wall thereof whereby air may flow through said spokes into said drum structure, and a baffle within each of said spokes cutting off the direct path of flow of said air from one of said openings to the other thereof.

18. A brake mechanism comprising a drum structure and a friction element structure, said drum structure comprising a plurality of concentric axially spaced rings affording a free space between them for the circulation of air about the inner and outer faces of said rings and through said space, and said friction element structure comprising a friction member adapted to co-act simultaneously with all of said rings.

19. A brake mechanism comprising a drum structure and a friction element structure said drum structure including a continuous annular friction surface and said friction element structure comprising a plurality of axially spaced sets of brake shoes affording a free space between them for the circulation of air about the inner and outer faces of said shoes and through said space, said drum structure having openings therein for the passage of air therethrough from between said shoes, and common means for simultaneously moving said brake shoes into engagement with the friction surface of said drum.

20. A brake mechanism comprising a brake drum unit including a plurality of axially spaced elements affording a free space between them for the circulation of air about the inner and outer faces of said elements and through said space, a friction unit coacting with all of the elements of said brake drum unit, and means for relatively urging said friction unit into coacting relationship with said brake drum unit.

EMIL A. NELSON.